US012799859B2

(12) United States Patent
Bennett et al.

(10) Patent No.: US 12,799,859 B2
(45) Date of Patent: Nov. 17, 2026

(54) PRESSURE PULSE INJECTOR FOR FLOWLINE

(71) Applicant: Halliburton Energy Services, Inc., Houston, TX (US)

(72) Inventors: David Bennett, Houston, TX (US); Graham Peter Jack, Newburgh (GB)

(73) Assignee: Halliburton Energy Services, Inc., Houston, TX (US)

( * ) Notice: Subject to any disclaimer, the term of this patent is extended or adjusted under 35 U.S.C. 154(b) by 269 days.

(21) Appl. No.: 18/902,303

(22) Filed: Sep. 30, 2024

(65) Prior Publication Data

US 2026/0092586 A1 Apr. 2, 2026

(51) Int. Cl.
*E21B 47/107* (2012.01)
*E21B 47/06* (2012.01)
*F17D 5/06* (2006.01)

(52) U.S. Cl.
CPC ............ *E21B 47/107* (2020.05); *E21B 47/06* (2013.01); *F17D 5/06* (2013.01)

(58) Field of Classification Search
CPC ........ E21B 21/08; E21B 21/10; E21B 47/006; E21B 47/18; E21B 47/00; E21B 47/002; E21B 47/06; E21B 47/107; F17D 5/06; G01M 3/243; G01M 3/28
See application file for complete search history.

(56) References Cited

U.S. PATENT DOCUMENTS 4,750,583 A 6/1988 Wolf
5,708,193 A * 1/1998 Ledeen .............. G01M 3/2807 73/40
6,993,963 B1 2/2006 Gudmundsson
7,399,719 B2 7/2008 Hanan et al.
2018/0356046 A1 12/2018 Gong
2020/0173880 A1 6/2020 Bennett et al.
2020/0309741 A1 10/2020 Giunta et al.
2021/0032979 A1* 2/2021 Granville ............ G01V 11/002
2021/0108504 A1 4/2021 Jagannathan et al.
2024/0052714 A1* 2/2024 Bennett ................ E21B 47/107
2025/0075598 A1* 3/2025 El Mallawany ........ E21B 43/12
2026/0092586 A1* 4/2026 Bennett ................ F02M 47/046

FOREIGN PATENT DOCUMENTS

EP 697587 A2 * 2/1996
EP 1024352 A2 8/2000
EP 2824482 B1 1/2019
WO 2019096854 A1 5/2019
WO WO-2026072077 A1 * 4/2026 .......... F02M 63/005

OTHER PUBLICATIONS

Application No. PCT/US2024/055444, International Search Report and Written Opinion, Mailed on Jun. 25, 2025, 9 pages.

* cited by examiner

*Primary Examiner* — Daniel P Stephenson
(74) *Attorney, Agent, or Firm* — Kilpatrick Townsend & Stockton LLP

(57) ABSTRACT

A pressure pulse injector can include an accumulator, valves, and a control system. The control system can receive parameters, including a maximum pressure and target distance, about a flowline. The control system can determine a change in pressure for a pressure pulse based on the parameters. The control system can determine a pressurization level for fluid in the accumulator. The control system can transmit the pressure pulse into the flowline. The control system can determine, using a reflected pressure pulse, information about an anomaly in the flowline.

20 Claims, 4 Drawing Sheets

PRESSURE PULSE INJECTOR FOR FLOWLINE

TECHNICAL FIELD

The present disclosure relates generally to wellbore operations and, more particularly (although not necessarily exclusively), to a pressure pulse injector that can be used to provide injected pressure pulses for a flowline for a diagnostic evaluation of the flowline or operations associated with the flowline.

BACKGROUND

Wellbore operations may include various equipment, components, methods, or techniques to perform various tasks, such as fluid control, with respect to a wellbore. In some examples, the wellbore operations may involve evaluating a flowline to determine whether an anomaly exists in the flowline. In some examples, the anomaly may be or include a deposition of material, a blockage in the flowline, a leak in the flowline, debris left in the flowline, etc. Determining a precise location, a precise magnitude, or a combination thereof, for example for repairing or maintaining the flowline, of the anomaly can be difficult.

DETAILED DESCRIPTION

Figure 1:
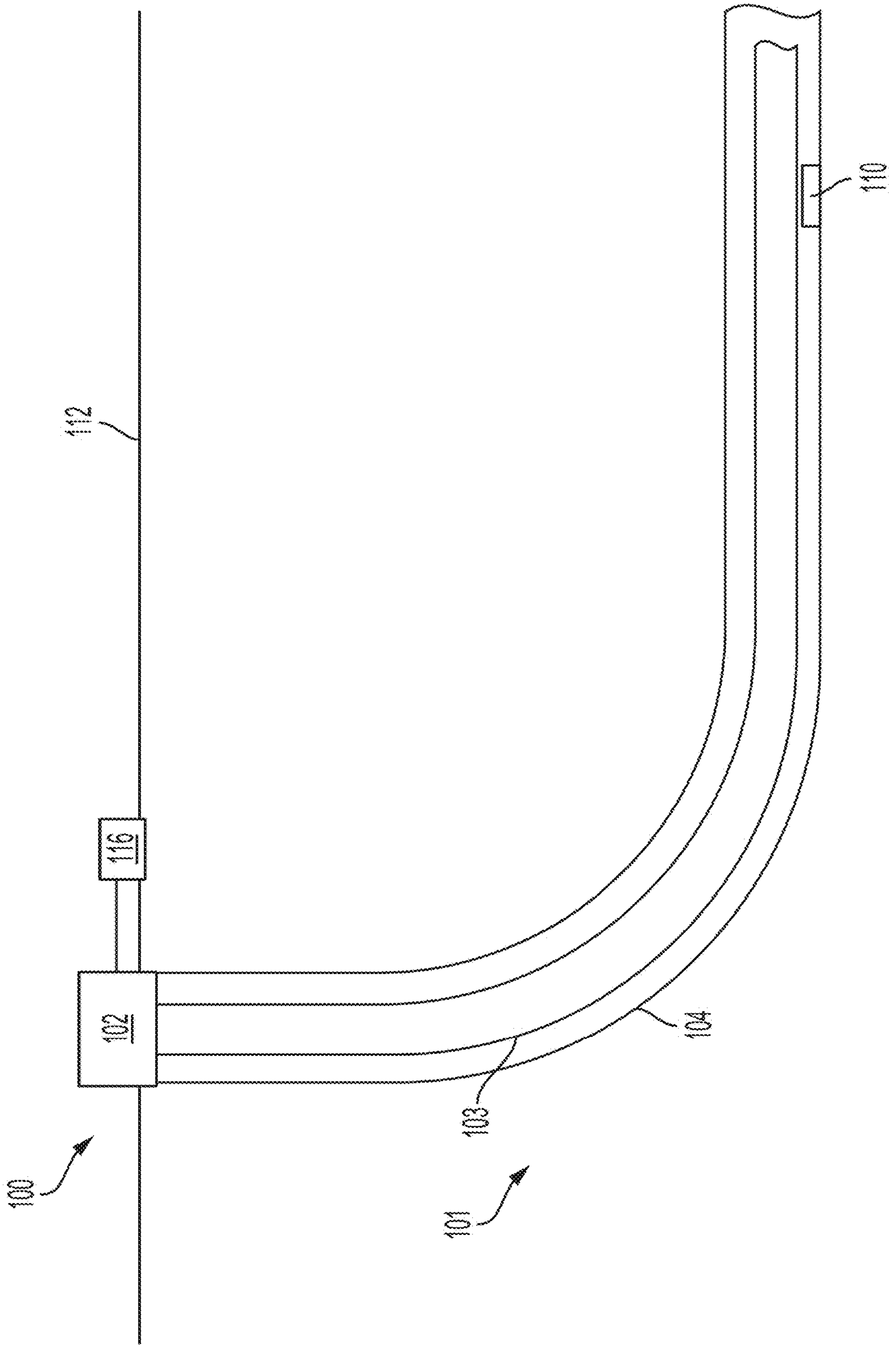
FIG. 1 is a diagram of a flowline system that can use a pressure pulse injector according to some aspects of the present disclosure.

Certain aspects and examples of the present disclosure relate to a pressure pulse injector for injecting a pressure pulse into a flowline to facilitate one or more operations with respect to the flowline. In some examples, the flowline may be or include a wellbore, a pipeline, which may be positioned in a wellbore, at a surface thereof, etc., or other suitable type of flowline that can transport material such as water, hydrocarbon material, or other suitable material. The pressure pulse injector may be positioned proximate to, or within, the flowline to inject a pressure pulse into the flowline. The pressure pulse may be used to perform the one or more operations, which may be or include an evaluation of the flowline. In some examples, the evaluation can include determining whether an anomaly exists in the flowline to facilitate a maintenance or repair operation on the flowline. The anomaly can include a deposition, a blockage, a leak, other anomaly, or any combination thereof. The anomaly may negatively affect an operation of the flowline, and a result of the pressure pulse can be used to perform the maintenance or repair operation, or other remedial operation, to enhance an operation of the flowline. The pressure pulse injector may include hardware components, such as an accumulator, a set of valves, a control system, etc., that can be controlled to generate the pressure pulse. The control system can include computer-executable instructions to determine a pressure change for the pressure pulse and to otherwise automate the pressure pulse injector to generate the pressure pulse without intervention and while staying within boundary conditions for the pressure pulse.

In some examples, pressure pulse analysis may involve a water hammer to be created in a flowline such as a wellbore or a pipeline. The water hammer may potentially damage, such as due to excessive pressure, the flowline or equipment associated with the flowline. Determining constraints for pressure pulse magnitudes can allow pressure pulses to be used in the flowline without damaging the flowline or equipment associated therewith. Other systems may not be able to determine the constraints or may not otherwise be able to inject a pressure pulse into the flowline. For example, other systems, such as those that use commercial gas guns, accumulation valves, and other external mechanisms, may encounter failures in pressure pulses either by generating a pressure pulse with not enough magnitude to receive any useful information or by generating a pressure pulse with magnitude exceeding a maximum allowable operating pressure, which can cause significant damage to a flowline or to equipment associated with the flowline.

A pressure pulse injector, or a system that includes a pressure pulse injector, can determine appropriate parameters, such as magnitudes, of a pressure pulse for injection into a flowline. The pressure pulse injector can integrate the calculation of the parameters with hardware or other components of the pressure pulse injector to generate and inject a pressure pulse into the flowline in which the pressure pulse is designed to provide information about the flowline without damaging the flowline or equipment associated therewith. In some examples, the pressure pulse injector can close a loop between simulations and field results for the pressure pulse. For example, the pressure pulse injector can simulate results of a potential pressure pulse and then inject the pressure pulse into the flowline to evaluate the flowline. The pressure pulse injector can use simulation results, field results, or a combination thereof to generate iterations of the pressure pulse that are contained within boundary conditions of the flowline. The boundary conditions may include a maximum allowable operating pressure, a distance to a point of interest to evaluate in the flowline, or other suitable boundary conditions.

In some examples, the pressure pulse injector can automate calculations for the pressure pulse, can automate generation of the pressure pulse, etc. Automating the calculations, the generation, etc. with respect to the pressure pulse can involve using a control system, or other computing device, of the pressure pulse injector to perform the respective operations. For example, the pressure pulse injector can use the control system to calculate a magnitude of the pressure pulse, or to calculate changes in velocity, changes in pressure, etc., for generating the pressure pulse. Additionally or alternatively, the pressure pulse injector can use the control system to selectively actuate a set of valves of the pressure pulse injector for physically generating the pressure pulse based on the automated calculations and without manual intervention. By automating the calculation and generation of the pressure pulse, safety of evaluation systems for flowlines can be increased. For example, evaluation systems for flowlines that use the pressure pulse system may inject pressure pulses into the flowlines with a reduced or a substantially zero risk for damaging the flowline or any equipment thereof. Additionally or alternatively, the evaluation systems for flowlines that use the pressure pulse injector can transmit pressure pulses further distances than other systems that do not use the pressure pulse injector.

The pressure pulse injector may include a control system, a tunable accumulator, a pressurized source, and a flowline. In some examples, the pressure pulse injector may include additional, alternative, or fewer components to facilitate generation and injection of a pressure pulse into the flowline. The control system may include one or more systems, such as computing devices, that can:

- manage a maximum allowable operating pressure threshold. Managing the threshold may involve calculating the threshold or making sure that subsequent calculations of pressure comply with the threshold.
- calculate a minimum pressure pulse magnitude. Calculating the minimum pressure pulse magnitude can involve identifying a force for sending a signal into the flowline for receiving a reflected signal that can be used to infer information about the flowline or anomalies included therein.
- calculate a mass balance for use in the flowline to generate a pressure pulse. If the mass balance calculated cause the threshold to be exceeded, the control system may abort an operation involving the pressure pulse.
- gather pressure information such as a pressure pulse magnitude or a pressure pulse reflection.
- control the accumulator. Controlling the accumulator may involve controlling pressurization of the accumulator, controlling an operation of the accumulator, etc.

The accumulator may be tunable and may include one or more components for facilitating generation of the pressure pulse. For example, the accumulator may include a piston-like enclosure for management of pressure balance and mass balance of fluid used to generate the pressure pulse. Additionally or alternatively, the accumulator, or the pressure pulse injector, may include a set of valves that can be used to release material into the flowline, that can be used to pressurized the material while in the accumulator, etc. The pressurized source can include an inert material such as nitrogen, carbon dioxide, other liquid or gas, etc. that can be used to pressurize material included in the accumulator. The pressure pulse generated by the pressure pulse injector can be injected into the flowline to evaluate the flowline. In some examples, evaluating the flowline may include using a reflected pressure pulse signal to determine a location of an anomaly in the flowline, to determine a type of the anomaly in the flowline, to determine a size of the anomaly in the flowline, or to determine other suitable information about the anomaly in the flowline.

The pressure pulse injector, or the control system thereof, can perform one or more operations for calculating parameters for a pressure pulse, generating a pressure pulse, injecting a pressure pulse into a flowline, or any combination thereof. For example, the pressure pulse injector can determine a maximum allowable operating pressure of the flowline or of a system that includes the flowline. If the maximum allowable operating pressure is unknown or cannot be calculated, the pressure pulse injector may require a manual override from an operator of the flowline system prior to proceeding with injection of the pressure pulse. The pressure pulse injector can additionally collect or otherwise determine parameters relating to the flowline. For example, the parameters can include a flowline diameter, a flowline connection size or minimum orifice size, a target distance for transmitting the pressure pulse, flowline operating conditions, other suitable parameters, or any combination thereof. In some examples, the flowline operating conditions can include a material bulk modulus, a material density, a material viscosity, a material acoustic velocity, a solids percentage, a liquid percentage, a gas percentage, other suitable flowline operating conditions, or any suitable combination thereof. As used above, a material may include material positioned within the flowline, material that forms the flowline, or a combination thereof. For example, the material may include one or more metals that are used to form the flowline, the material may include fluid flowing within the flowline, etc.

The pressure pulse injector can determine parameters for generating the pressure pulse to be injected into the flowline. The parameters may include a change in pressure, a change in velocity, conservation of momentum-based parameters, etc. For example, the pressure pulse injector can use the Darcy-Weisbach equation, or other suitable equation that considers friction and pressure or signal attenuation, to determine a change in pressure for traversing the target distance and for returning a viable reflected pressure pulse signal. The pressure pulse injector can validate that the determined change in pressure does not exceed the maximum allowable operating pressure, and, if the determined change in pressure does not exceed the maximum allowable operating pressure, the pressure pulse injector can proceed with subsequent operations for generating and injecting the pressure pulse. Additionally or alternatively, if the determined change in pressure exceeds the maximum allowable operating pressure, the pressure pulse injector can request permission to proceed with subsequent operations for generating and injecting the pressure pulse prior to proceeding.

Using conservation of mass and momentum, a change in pressure and volume from the accumulator to create a velocity, which may be determined using the Joukowsky equation or similar equation, for the pressure pulse can be calculated. In some examples, the pressure pulse injector can factor in inputs from a gas gun or accumulator used by the pressure pulse injector to account for volume differentials from a connection point, such as a connection with the accumulator, into the flowline. The pressure pulse injector can use a result of the above-described calculations to control physical components of the pressure pulse injector to generate and inject into the flowline the pressure pulse.

The pressure pulse injector can selectively open and close valves to generate and inject the pressure pulse. For example, a valve that leads to the flowline can be closed, and a valve leading to the pressurized source can be opened. The accumulator can be pressured to an identified target pressure based on the above-described calculations. The valve leading to the pressurized source can be closed, and the valve leading to the flowline can be opened to cause the pressure pulse to be injected into the flowline. Another valve can be opened to allow additional fluid into the accumulator that can be pressurized by exposing the accumulator to the pressurized sources. The pressure pulse injected into the flowline may travel into the flowline and may be reflected by an anomaly or other point of interest in the flowline. The reflected pressure pulse can be detected by the pressure pulse injector, and variations between the detected reflected pressure pulse and an expected reflected pressure pulse can be used to determine information about the anomaly. For example, the variations can be used to determine whether the anomaly is a deposition, leak, blockage, or other type of anomaly, can be used to determine a location of the anomaly, can be used to determine a size of the anomaly, or can be used to determine other suitable information about the anomaly or other point of interest.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a diagram of a flowline system 100 that can use a pressure pulse injector 102 according to some aspects of the present disclosure. In some examples, the flowline system 100 is illustrated for a pipeline 103 positioned in a wellbore 104, such as an oil or gas wellbore, for extracting fluids from a subterranean formation 101. For example, the wellbore 104 can be used to extract water, oil, gas, other suitable fluid or material, or any combination thereof from the subterranean formation 101. As illustrated, the wellbore 104 is formed in the subterranean formation 101, but the wellbore 104 can be formed in a sub-oceanic formation or in other suitable locations. The wellbore 104 can include the pipeline 103, which may be or include a casing or other suitable component for allowing produced fluid to be extracted from the wellbore 104.

In some examples, the flowline system 100 can include a well tool or downhole tool 122. The downhole tool 122 can be any suitable tool used to gather information about the wellbore 104, used to perform an operation in the wellbore 104, etc. For example, the downhole tool 122 can be a tool delivered downhole by wireline to perform operations such as wireline formation testing. Alternatively, the downhole tool 122 can include a completion tool, a stimulation tool such as a tool used for fracking, etc. In some examples, the downhole tool 122 can be used to deploy a sensing device or to otherwise deploy other suitable components in the wellbore 104. Additionally or alternatively, the downhole tool 122 can be, can include, or can be communicatively coupled to a repair or maintenance tool, such as a wellbore pig, that can be used to perform one or more operations in the wellbore 104 or the pipeline 103.

The wellbore 104, or the pipeline 103 positioned in the wellbore 104, may be a conduit for transporting fluid with respect to the flowline system 100. For example, the wellbore 104, or the pipeline 103, may produce hydrocarbon fluid from the subterranean formation 101, may transport mud, stimulation fluid, or other suitable fluid for use in the wellbore 104, in the pipeline 103, in the subterranean formation 101, or in a combination thereof, etc. Over time, an anomaly may form in the wellbore 104 or in the pipeline 103. For example, and as illustrated in FIG. 1, an anomaly 110 may form in the wellbore 104. In some examples, the anomaly 110 may be or include a leak, a deposition, an obstruction, debris, other anomaly, or any combination thereof. A leak may involve a crack or other unintentional perforation in the wellbore 104 that can allow fluid to exit the wellbore 104 in unintended locations. A deposition may involve a build-up of material, such as paraffins or other damaging materials, on an inside of the wellbore 104. An obstruction may involve a partial or complete loss of flow through the wellbore 104, and an example of the obstruction can include a wellbore tool, such as an inline pig, become stuck in the wellbore 104.

The pressure pulse injector 102 can be used to evaluate the wellbore 104 or the pipeline 103. In some examples, the pressure pulse injector 102 can be used to determine information about the anomaly 110. The information about the anomaly 110 may include a location of the anomaly 110, a size of the anomaly 110, a type of the anomaly 110, or other suitable information about the anomaly 110. The pressure pulse injector 102 can determine one or more parameters for a pressure pulse and can inject the pressure pulse into the wellbore 104 or into the pipeline 103. For example, the pressure pulse injector 102 can determine a pressure change or a velocity change for fluid to be injected into the wellbore 104 or into the pipeline 103 for generating the pressure pulse without damaging any component of the flowline system 100. The pressure pulse may reflect in the wellbore 104 or in the pipeline 103, and the reflected pressure pulse may be received by the pressure pulse injector 102. The reflected pressure pulse may be analyzed, for example by the pressure pulse injector 102 or a computing device associated with the pressure pulse injector 102, to determine whether the anomaly 110 exists and, if the anomaly 110 is detected, information, such as a location, a size, etc., about the anomaly 110.

In some examples, and as illustrated in FIG. 1, the pressure pulse injector 102 can be positioned at a surface 112 of the flowline system 100. While the pressure pulse injector 102 is illustrated as being positioned at the surface 112, in other examples, the pressure pulse injector 102 may be positioned in other suitable locations such as at a remote location, within the wellbore 104 or the pipeline 103, etc. Additionally or alternatively, the pressure pulse injector 102 may be communicatively coupled with a control system 116 that can be or include a computing device. The control system 116 may receive data, such as geometric conditions of the wellbore 104 or the pipeline 103, operating conditions of the wellbore 104 or the pipeline 103, or other suitable data, and the control system 116 may determine one or more parameters about a pressure pulse to inject into the wellbore 104 or the pipeline 103. The one or more parameters may include a pressure change, a velocity change, or other suitable parameters that can be adjusted to adjust the pressure pulse to be injected. In some examples, the control system 116 may be included in, such as within a common housing as, the pressure pulse injector 102.

Figure 2:
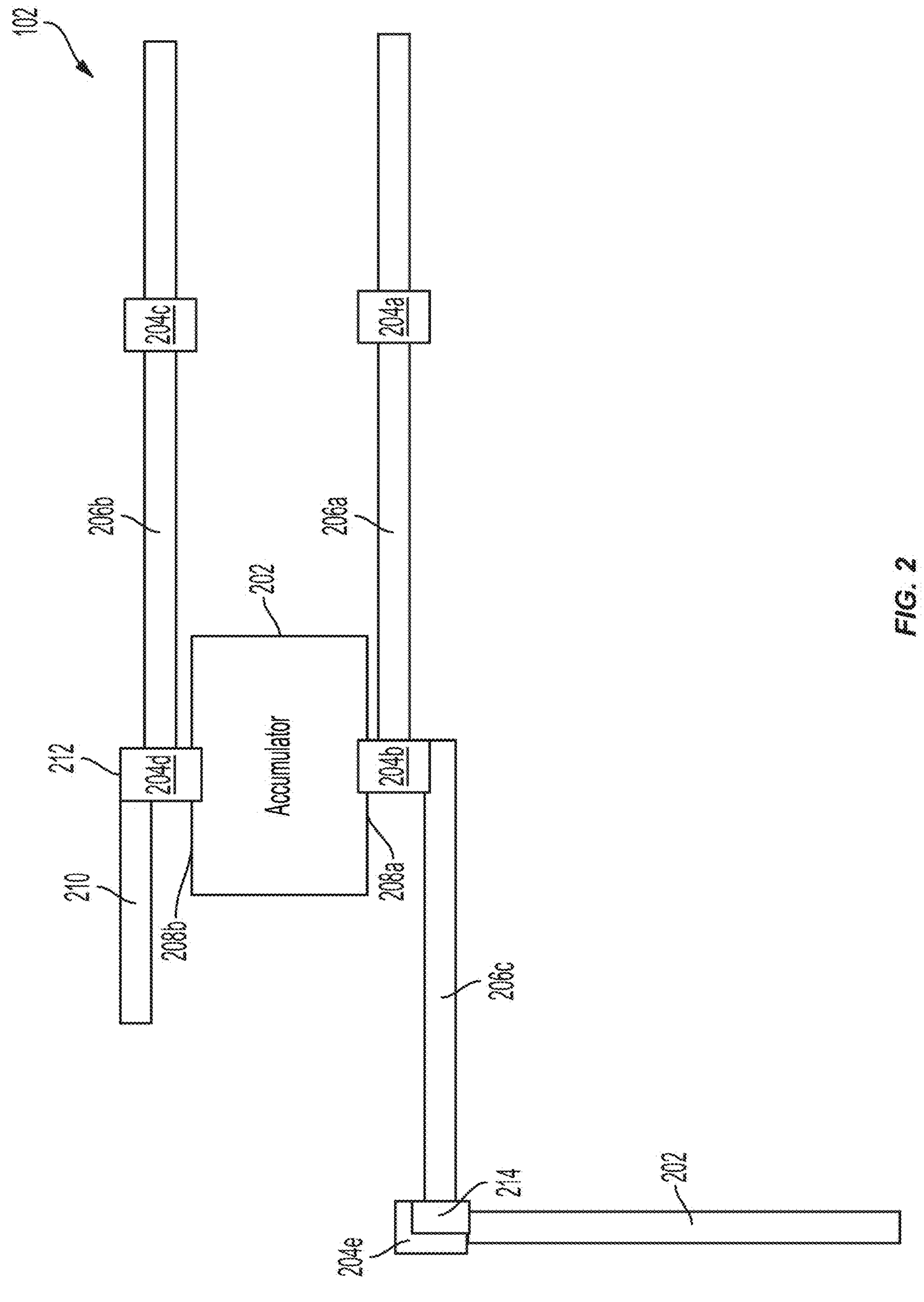
FIG. 2 is a block diagram of a pressure pulse injector that can inject a pressure pulse into a flowline according to some aspects of the present disclosure.

FIG. 2 is a block diagram of a pressure pulse injector 102 that can inject a pressure pulse into a flowline 200 according to some aspects of the present disclosure. As illustrated in FIG. 2, the pressure pulse injector 102 can include an accumulator 202 and a set of valves, though the pressure pulse injector 102 may include additional, alternative, or fewer components for facilitating generating and injecting a pressure pulse into a flowline 200. In some examples, the accumulator 202 may be or include a pressure vessel that can be sized to receive a fluid that can be pressurized. Additionally or alternatively, the accumulator 202 may be or include a straight pipe or other component that can receive the fluid and that can withstand pressurization of the fluid for generating the pressure pulse.

The set of valves can include a first valve 204*a*, a second valve 204*b*, a third valve 204*c*, a fourth valve 204*d*, and a fifth valve 204*e*, though other suitable numbers, such as less than five or more than five, of valves are possible to include in the pressure pulse injector 102. Each valve of the set of valves, or any subset thereof, may be or include an automatically controlled valve that can be actuated, such as opened or closed, with an electric motor or otherwise without manual intervention. Closing a valve may prevent or mitigate fluid flow through the valve, and opening the valve may allow or encourage fluid flow through the valve. In some examples, the pressure pulse injector 102 may include or be communicatively coupled with the control system 116 that can be used to control actuation of the set of valves or any subset thereof. For example, the control system 116 may selectively, individually, or both selectively and individually open or close each valve of the set of valves or any subset thereof. The control system 116 may selectively actuate the set of valves to pressurize fluid in the accumulator 202 to generate or inject a pressure pulse into the flowline 200.

In some examples, the first valve 204*a* may be positioned along a first fluid flow line 206*a* that may be positioned to convey pressure pulse fluid to the accumulator 202. The first fluid flow line 206*a* may extend from a source of the pressure pulse fluid to a first side 208*a* of the accumulator 202. Additionally or alternatively, the second valve 204*b* may be positioned adjacent to the first side 208*a* of the accumulator 202 to selectively allow the pressure pulse fluid into the accumulator 202, to selectively allow a pressure pulse out of the accumulator 202, or a combination thereof. The third valve 204*c* may be positioned along a second fluid flow line 206*b* that may be positioned to convey inert material, such as nitrogen gas or other inert material that can be used to pressurize the pressure pulse fluid, to the accumulator 202. The second fluid flow line 206*b* may extend from a source of the inert material to a second side 208*b* of the accumulator 202. Additionally or alternatively, the fourth valve 204*d* may be positioned adjacent to the second side 208*b* of the accumulator 202 to selectively allow the inert material into the accumulator 202, to selectively allow the inert material or other material out of the accumulator 202, or a combination thereof. For example, the fourth valve 204*d* may be opened to allow inert material into the accumulator 202 to pressurize the pressure pulse fluid for generating the pressure pulse. Additionally or alternatively, the fourth valve 204*d* may be opened to vent, such as via a vent line 210, the inert material or other material from the accumulator 202 to provide pressure relief to the accumulator 202. In some examples, a pressure sensor 212, or other suitable sensing device, can be positioned in the fourth valve 204*d* or otherwise adjacent to the accumulator 202 to monitor a level of pressurization of the pressure pulse fluid in the accumulator 202.

The fifth valve 204*e* may be positioned adjacent to the flowline 200 and along a third fluid flow line 206*c*. In some examples, the third fluid flow line 206*c* may originate from the first side 208*a* of the accumulator 202. In other example, the third fluid flow line 206*c* may extend from a third side, which may be different than the first side 208*a* and the second side 208*b*, of the accumulator 202 to the flowline 200. The fifth valve 204*e* may be selectively actuated to allow or restrict material, such as the pressure pulse fluid, from entering the flowline 200. In some examples, the fifth valve 204*e* may be opened to allow the pressure pulse to be injected into the flowline 200, and the fifth valve 204*e* may be subsequently closed to prevent a reflected pressure pulse from being received by the accumulator 202, by the third fluid flow line 206*c*, or by other potentially sensitive or fragile components of the pressure pulse injector 102. In some examples, the pressure pulse injector 102 may additionally include a pressure transducer 214 that can be positioned in the fifth valve 204*e*, adjacent to the fifth valve 204*e*, or in other suitable locations for receiving the reflected pressure pulse. In some examples, the pressure transducer 214 can include, or can be replaced by, a flow meter that can track a mass, a volume, or a combination thereof of fluid injected into the flowline 200 for the injected pressure pulse.

Figure 3:
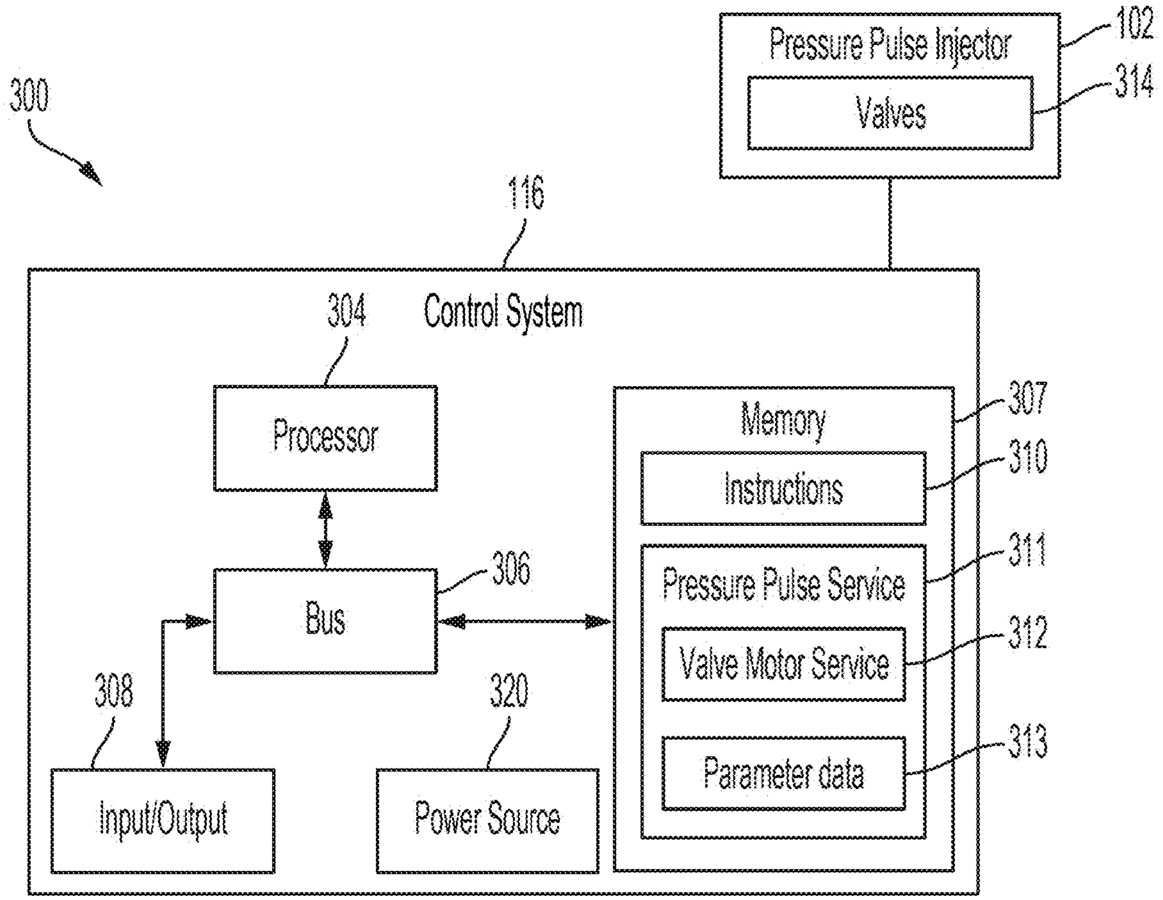
FIG. 3 is a block diagram of a computing system that can be used with a pressure pulse injector according to some aspects of the present disclosure.

FIG. 3 is a block diagram of a computing system 300 that can be used with a pressure pulse injector 102 according to some aspects of the present disclosure. The components, such as processor 304, memory 307, power source 320, input/output 308, and so on, illustrated in FIG. 3, may be integrated into a single structure such as within a single housing of the control system 116 and in communication with, or otherwise included in, the pressure pulse injector 102. In some examples, the components illustrated in FIG. 3 can be distributed from one another and may be in electrical communication with each other. And, in other examples, the computing system 300 may be integrated into the pressure pulse injector 102, or vice versa.

The control system 116 can include the processor 304, the memory 307, and a bus 306, among other suitable components for the control system 116. The processor 304 can execute one or more operations for performing a set of operations for facilitating pressure pulse injection in the flowline 200. The processor 304 can execute computer-program instructions 310 stored in the memory 307 to perform the set of operations. The processor 304 can include one processing device or multiple processing devices or cores. Non-limiting examples of the processor 304 can include a field-programmable gate array ("FPGA"), an application-specific integrated circuit ("ASIC"), a microprocessor, and the like.

The processor 304 can be communicatively coupled with the memory 307 via the bus 306. The memory 307 may be or include non-volatile memory and may include any type of memory device that retains stored information when powered off. Some examples of non-volatile forms of the memory 307 may include EEPROM, flash memory, or any other type of non-volatile memory. In some examples, at least part of the memory 307 can include a medium from which the processor 304 can read computer-program instructions 310. A computer-readable medium can include electronic, optical, magnetic, or other storage devices capable of providing the processor 304 with computer-readable instructions or other program code. Some examples of a computer-readable medium may include magnetic disk (s), memory chip(s), ROM, RAM, an ASIC, a configured processor, optical storage, or any other medium from which a computer processor can read computer-program instructions 310. The computer-program instructions 310 can include processor-specific instructions generated by a compiler or an interpreter from code written in any suitable computer-programming language, including, for example, C, C++, C #, Perl, Java, Python, etc.

In some examples, the memory 307 can be a non-transitory computer readable medium and can include computer-program instructions 310. The computer-program instructions 310 can be executed by the processor 304 for causing the processor 304 to perform the set of operations. For example, the processor 304 can execute a pressure pulse service 311, or other suitable computer services, artificial intelligence models, etc., to provide functionality for the control system 116, the pressure pulse injector 102, etc. For example, the processor 304 can cause parameter data 313, such as flowline data, to be gathered by the pressure pulse injector 102. Additionally or alternatively, the processor 304 can execute a valve motor service 312 to cause valves 314 of the pressure pulse injector 102 to be actuated to control pressurization or fluid flow with respect to the pressure pulse injector 102. Additionally or alternatively, the processor 304 can execute the pressure pulse service 311 to perform a set of operations for causing the pressure pulse injector 102 to generate and inject a pressure pulse into the flowline 200.

In some examples, the control system 116 can include an input/output 308. The input/output 308 can connect to a keyboard, a pointing device, a display, other computer input/output devices or any combination thereof. An operator may provide input using the input/output 308. In some examples, the control system 116 may be fully autonomous and may function without input from an operator. Data relating to the flowline 200, the pressure pulse to be injected into the flowline 200, the pressure pulse injector 102, or any combination thereof can be displayed to an operator of a wellbore operation through a display that is connected to or is part of the input/output 308. The displayed values can be observed by the operator, or by another suitable user, of the wellbore operation, who can adjust the wellbore operation based on the output. Additionally or alternatively, the control system 116 can automatically control or adjust the wellbore operation, which may be or include a maintenance or repair operation, based on the output, which may be or include an analysis of a reflected pressure pulse received from the flowline 200.

Figure 4:
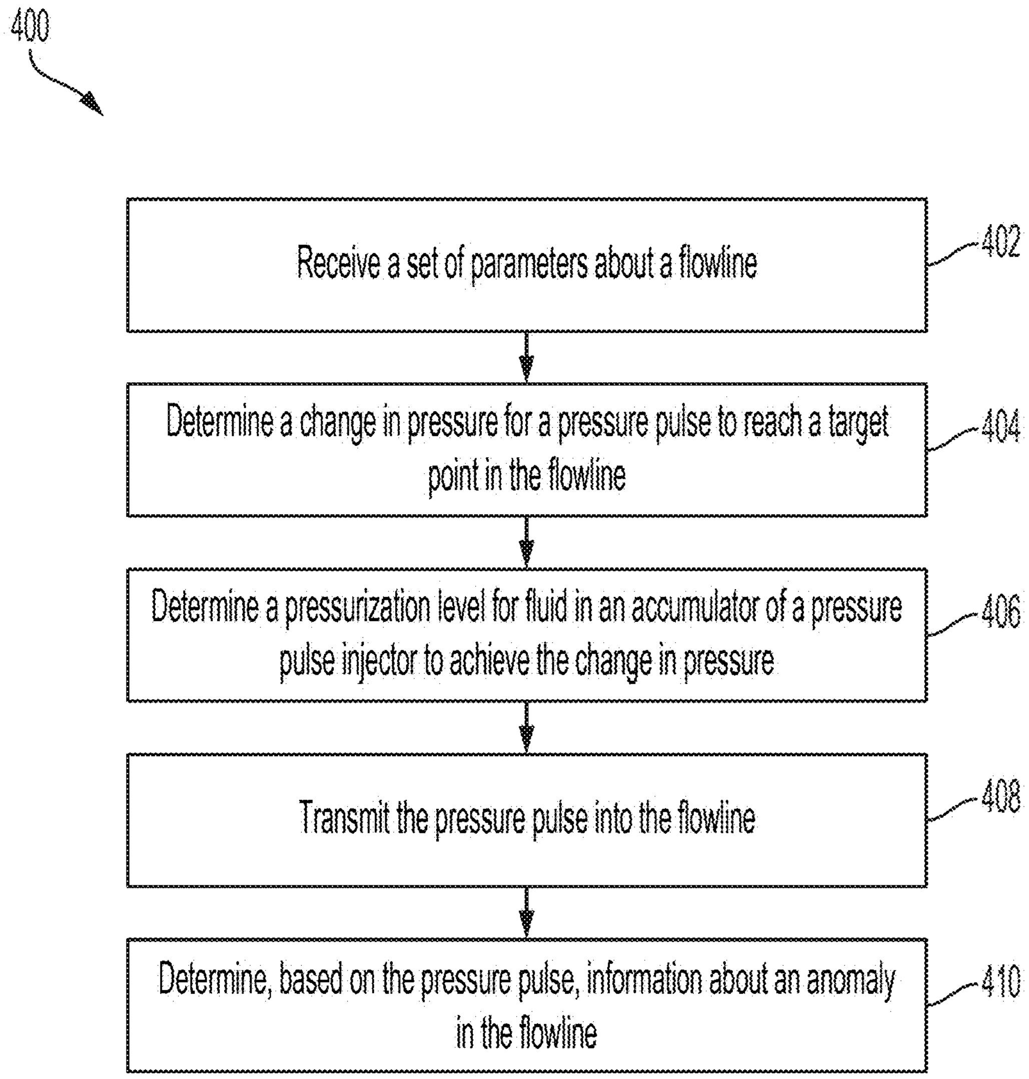
FIG. 4 is a flowchart of a process for using a pressure pulse injector to inject a pressure pulse into a flowline for performing an operation with respect to the flowline according to some aspects of the present disclosure.

FIG. 4 is a flowchart of a process 400 for using a pressure pulse injector 102 to inject a pressure pulse into a flowline 200 for performing an operation with respect to the flowline 200 according to some aspects of the present disclosure. At block 402, a set of parameters is received. The set of parameters may relate to or otherwise be about a flowline such as the flowline 200. The set of parameters can include geometric conditions about the flowline, operating conditions for the flowline, and other suitable parameters for the flowline. In some examples, the set of parameters can include a maximum allowable operating pressure for the flowline, a distance to a point of interest in the flowline, a diameter of the flowline, one or more materials that form the flowline, one or more materials flowing within the flowline, an acoustic velocity of the one or more materials flowing within the flowline, etc. In some examples, the set of parameters may be input by an operator of an operation that involves the flowline. Additionally or alternatively, the set of parameters, or any suitable subset thereof, may be measured or otherwise determined by the pressure pulse injector 102. For example, the pressure pulse injector 102 may directly measure the geometric properties about the flowline, properties about fluid flowing in the flowline, other parameters of the set of parameters, or any combination thereof.

At block 404, a change in pressure for a pressure pulse is determined by the pressure pulse injector 102. The pressure pulse injector 102, or any computing device thereof, such as the control system 116, can use the set of parameters to calculate or otherwise determine a change in pressure that can be applied to a pressure pulse to cause the pressure pulse to travel at least to the point of interest in the flowline and return a reflected pressure pulse that can be analyzed. In some examples, the pressure pulse injector 102 can use one or more equations or operations that consider friction, signal or pressure attenuation in the flowline, or a combination thereof to determine the change in pressure. An example of an equation that can be used to determine the change in pressure can include the Darcy-Weisbach equation, though other suitable equations or operations can be used in addition to, or in place of, the Darcy-Weisbach equation to determine the change in pressure. The change in pressure may cause the pressure pulse to have a high enough magnitude to travel at least to the point of interest while retaining enough momentum to generate a reflected pressure pulse that can be received at the pressure pulse injector 102 and that can be analyzed to determine information about the flowline 200 or features thereof.

At block 406, a pressurization level for fluid included in an accumulator 202 of the pressure pulse injector 102 is determined. The pressure pulse injector 102 can compare the determined change in pressure to the maximum allowable operating pressure to determine whether the pressure pulse may damage the flowline 200. In examples in which the change in pressure does not exceed the maximum allowable operating pressure, the pressure pulse injector 102 may proceed with determining the pressurization level. In examples in which the change in pressure exceeds the maximum allowable operating pressure, the pressure pulse injector 102 may request an override prior to proceeding with the pressurization. If an override command is not received, the pressure pulse injector 102 may terminate the process 400 to prevent damage to the flowline 200 or any component or feature thereof.

The pressurization level may represent a pressure of pressure pulse fluid in the accumulator 202. In some examples, the pressure pulse fluid may be or include water, but other fluids can be positioned in the accumulator 202 to be pressurized to form the pressure pulse. In some examples, the pressure pulse injector 102 may adjust the pressurization level by selectively actuating a set of valves included in the pressure pulse injector 102. For example, the pressure pulse injector 102 may open a valve along a fluid flow line extending from a pressurized source, such as a pressurized source of inert material, to cause inert material to flow into the accumulator 202 and increase the pressurization level. A pressure sensor 212 can be used to monitor the pressurization level, and, in response to determining that the pressurization level is sufficient for the pressure pulse, the valve may be automatically closed to prevent the pressurization level from further increasing. In response to the pressure pulse injector 102 determining that the pressurization level is too high, a separate valve may be opened to vent at least some of the inert material from the accumulator 202 to provide pressure relief for the pressure pulse injector 102.

At block 408, the pressure pulse is transmitted into the flowline 200. In some examples, the pressure pulse injector 102 can determine, based on above-described operations or calculations that at least indicate that a magnitude of the pressure pulse may not exceed the maximum allowable operating pressure, that the pressure pulse is safe to inject into the flowline 200. The pressure pulse injector 102 can selectively actuate a valve leading to the flowline 200 to generate the pressure pulse and to transmit the pressure pulse into the flowline 200. In some examples, the pressure pulse injector 102 can open the valve leading to the flowline 200 for a predetermined amount of time to generate the pressure pulse and then close the valve to prevent a reflected signal from affecting the pressure pulse injector 102.

At block 410, information about an anomaly 110 in the flowline 200 is determined. The pressure pulse can travel into the flowline 200 and can reflect off of the anomaly 110 to generate the reflected pressure pulse. The reflected pressure pulse signal may have a signal, a magnitude, a phase, etc. that may be adjusted with respect to the pressure pulse and with respect to an expected reflected pressure pulse of the flowline 200 without an anomaly. The reflected pressure pulse can be received, for example at the pressure transducer 214 or other suitable detection device, and the pressure pulse injector 102, or the control system 116 thereof, may analyze the received reflected pressure pulse. For example, the received reflected pressure pulse may be compared to the expected reflected pressure pulse to determine the information about the anomaly 110. In some examples, the information can include a type of the anomaly, a location of the anomaly, a size of the anomaly, etc. The anomaly 110 may be or include a deposition, such as including damaging material, on an inside of the flowline 200, a leak in the flowline 200, an obstruction, such as a wellbore tool or pipeline tool, in the flowline 200, etc. In some examples, the information about the anomaly 110 can be used to perform or guide an operation with respect to the flowline 200. For example, a repair operation or a maintenance operation can be performed using the information about the anomaly 110. In some examples, the repair operation or the maintenance operation can involve removing, from the flowline 200, a pigging tool that is stuck in the flowline 200 and that is obstructing flow through the flowline 200. Other suitable operations can be performed with respect to the flowline 200 and based on the information.

In some aspects, pressure pulse injectors, methods, and systems for generating and injecting a pressure pulse into a flowline are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a pressure pulse injector comprising: an accumulator coupled with a flowline, the accumulator sized to receive a fluid; a plurality of valves coupled with the accumulator to control pressurization of the fluid in the accumulator; and a control system coupled with the plurality of valves and the accumulator to automatically perform operations comprising: receiving a set of parameters associated with the flowline, the set of parameters comprising a maximum allowable operating pressure and a distance to a point of interest in the flowline; determining, based on the set of parameters, a change in pressure for a pressure pulse to reach the point of interest; in accordance with determining that the change in pressure is approximately less than or equal to the maximum allowable operating pressure, determining a pressurization level for pressurizing the fluid to generate the pressure pulse; transmitting the pressure pulse into the flowline; and determining, using a reflected pressure pulse receivable from the flowline, information about an anomaly in the flowline.

Example 2 is the pressure pulse injector of example 1, wherein the accumulator comprises a pressure vessel, wherein the pressure pulse injector further comprises a pressure sensor coupled with the pressure vessel to continuously monitor the pressurization of the fluid in the pressure vessel, and wherein the operation of transmitting the pressure pulse into the flowline comprises using a reading of the pressure sensor to cause the pressure pulse to be transmitted into the flowline when a measured pressure of the fluid corresponds with the pressurization level.

Example 3 is the pressure pulse injector of example 1, wherein the plurality of valves comprises: a first valve coupled with a first side of the accumulator, wherein the first valve is usable to control a flow of the fluid into the accumulator; a second valve coupled with a second side of the accumulator, wherein the second valve is usable to control flow of an inert material into the accumulator to adjust the pressurization level in the accumulator; and a third valve coupled with a third side of the accumulator that is different from the first side and the second side, wherein the third valve is usable to control flow of the pressure pulse from the accumulator into the flowline.

Example 4 is the pressure pulse injector of example 3, further comprising a plurality of fluid flow lines, wherein the plurality of fluid flow lines comprises: a first fluid flow line coupled with the first valve to controllably provide the fluid to the accumulator via the first side of the accumulator; a second fluid flow line coupled with the second valve to controllably provide the inert material via the second side of the accumulator; and a third fluid flow line coupled with a third side of the accumulator, wherein the third fluid flow line extends from the accumulator to the flowline for providing the pressure pulse into the flowline.

Example 5 is the pressure pulse injector of example 1, wherein the plurality of valves comprises a vent valve that is usable to provide pressure relief, based at least in part on the pressurization level, for the accumulator.

Example 6 is the pressure pulse injector of example 1, wherein: the set of parameters further comprises one or more geometric conditions of the flowline and one or more flowline operating conditions; and the operation of transmitting the pressure pulse into the flowline comprises generating the pressure pulse by selective opening, based at least in part on the change in the pressure that is determinable based on the set of parameters, a subset of the plurality of valves to cause the fluid in the accumulator to reach the pressurization level.

Example 7 is the pressure pulse injector of example 1, wherein the operations further comprise performing a maintenance or repair operation on the flowline based at least in part on the information about the anomaly.

Example 8 is a method comprising: receiving, by a pressure pulse injector, a set of parameters associated with a flowline coupled with the pressure pulse injector, the set of parameters comprising a maximum allowable operating pressure and a distance to a point of interest in the flowline; determining, based on the set of parameters and by using the pressure pulse injector, a change in pressure for a pressure pulse to reach the point of interest; in accordance with determining that the change in pressure is approximately less than or equal to the maximum allowable operating pressure, determining, by the pressure pulse injector, a pressurization level for pressurizing fluid in an accumulator of the pressure pulse injector to generate the pressure pulse; transmitting, by the pressure pulse injector and by controlling a plurality of valves of the pressure pulse injector, pressure the pressure pulse into the flowline; and determining, by the pressure pulse injector and by using a reflected pressure pulse received from the flowline, information about an anomaly in the flowline.

Example 9 is the method of example 8, wherein the accumulator comprises a pressure vessel, wherein the pressure pulse injector further comprises a pressure sensor coupled with the pressure vessel to continuously monitor pressurization of the fluid in the pressure vessel, and wherein transmitting the pressure pulse into the flowline comprises using a reading of the pressure sensor to cause the pressure pulse to be transmitted into the flowline when a measured pressure of the fluid corresponds with the pressurization level.

Example 10 is the method of example 8, further comprising generating the pressure pulse by pressurizing the accumulator by: controlling a first valve of the plurality of valves to provide the fluid to the accumulator; controlling a second valve of the plurality of valves to provide inert material to the accumulator to pressurize the accumulator according to the pressurization level; and controlling a third valve of the plurality of valves to provide the pressure pulse to the flowline.

Example 11 is the method of example 10, wherein the pressure pulse injector further comprises a plurality of fluid flow lines, wherein the plurality of fluid flow lines comprises: a first fluid flow line coupled with the first valve to controllably provide the fluid to the accumulator via a first side of the accumulator; a second fluid flow line coupled with the second valve to controllably provide the inert material via a second side of the accumulator; and a third fluid flow line coupled with a third side of the accumulator, wherein the third fluid flow line extends from the accumulator to the flowline for providing the pressure pulse into the flowline.

Example 12 is the method of example 8, further comprising, in accordance with determining that a pressure of the accumulator exceeds the pressurization level, venting the accumulator using a vent valve to provide pressure relief for the accumulator.

Example 13 is the method of example 8, wherein: the set of parameters further comprises one or more geometric conditions of the flowline and one or more flowline operating conditions; and transmitting the pressure pulse into the flowline comprises generating the pressure pulse by selective opening, based at least in part on the change in the pressure that is determinable based on the set of parameters, a subset of the plurality of valves to cause the fluid in the accumulator to reach the pressurization level.

Example 14 is the method of example 8, further comprising performing a maintenance or repair operation on the flowline based at least in part on the information about the anomaly.

Example 15 is a system comprising: a flowline; and a pressure pulse injector comprising: an accumulator coupled with a flowline, the accumulator sized to receive a fluid; a plurality of valves coupled with the accumulator to control pressurization of the fluid in the accumulator; and a control system coupled with the plurality of valves and the accumulator to automatically perform operations comprising: receiving a set of parameters associated with the flowline, the set of parameters comprising a maximum allowable operating pressure and a distance to a point of interest in the flowline; determining, based on the set of parameters, a change in pressure for a pressure pulse to reach the point of interest; in accordance with determining that the change in pressure is approximately less than or equal to the maximum allowable operating pressure, determining a pressurization level for pressurizing the fluid to generate the pressure pulse; transmitting the pressure pulse into the flowline; and determining, using a reflected pressure pulse receivable from the flowline, information about an anomaly in the flowline.

Example 16 is the system of example 15, wherein the accumulator comprises a pressure vessel, wherein the pressure pulse injector further comprises a pressure sensor coupled with the pressure vessel to continuously monitor the pressurization of the fluid in the pressure vessel, and wherein the operation of transmitting the pressure pulse into the flowline comprises using a reading of the pressure sensor to cause the pressure pulse to be transmitted into the flowline when a measured pressure of the fluid corresponds with the pressurization level.

Example 17 is the system of example 15, wherein: the plurality of valves comprises: a first valve coupled with a first side of the accumulator, wherein the first valve is usable to control a flow of the fluid into the accumulator; a second valve coupled with a second side of the accumulator that is opposite the first side, wherein the second valve is usable to control flow of an inert material into the accumulator to adjust the pressurization level in the accumulator; and a third valve coupled with a third side of the accumulator that is different from the first side and the second side, wherein the third valve is usable to control flow of the pressure pulse from the accumulator into the flowline; and the pressure pulse injector further comprises a plurality of fluid flow lines, wherein the plurality of fluid flow lines comprises: a first fluid flow line coupled with the first valve to controllably provide the fluid to the accumulator via the first side of the accumulator; a second fluid flow line coupled with the second valve to controllably provide the inert material via the second side of the accumulator; and a third fluid flow line coupled with a third side of the accumulator, wherein the third fluid flow line extends from the accumulator to the flowline for providing the pressure pulse into the flowline.

Example 18 is the system of example 15, wherein the plurality of valves comprises a vent valve that is usable to provide pressure relief, based at least in part on the pressurization level, for the accumulator.

Example 19 is the system of example 15, wherein: the set of parameters further comprises one or more geometric conditions of the flowline and one or more flowline operating conditions; and the operation of transmitting the pressure pulse into the flowline comprises generating the pressure pulse by selective opening, based at least in part on the change in the pressure that is determinable based on the set of parameters, a subset of the plurality of valves to cause the fluid in the accumulator to reach the pressurization level.

Example 20 is the system of example 15, wherein the operations further comprise performing a maintenance or repair operation on the flowline based at least in part on the information about the anomaly.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A pressure pulse injector comprising:

an accumulator coupled with a flowline, the accumulator sized to receive a fluid;

a plurality of valves coupled with the accumulator to control pressurization of the fluid in the accumulator; and a control system coupled with the plurality of valves and the accumulator to automatically perform operations comprising:

receiving a set of parameters associated with the flowline, the set of parameters comprising a maximum allowable operating pressure and a distance to a point of interest in the flowline;

determining, based on the set of parameters, a change in pressure for a pressure pulse to reach the point of interest;

in accordance with determining that the change in pressure is approximately less than or equal to the maximum allowable operating pressure, determining a pressurization level for pressurizing the fluid to generate the pressure pulse;

transmitting the pressure pulse into the flowline; and determining, using a reflected pressure pulse receivable from the flowline, information about an anomaly in the flowline.

2. The pressure pulse injector of claim 1, wherein the accumulator comprises a pressure vessel, wherein the pressure pulse injector further comprises a pressure sensor coupled with the pressure vessel to continuously monitor the pressurization of the fluid in the pressure vessel, and wherein the operation of transmitting the pressure pulse into the flowline comprises using a reading of the pressure sensor to cause the pressure pulse to be transmitted into the flowline when a measured pressure of the fluid corresponds with the pressurization level.

3. The pressure pulse injector of claim 1, wherein the plurality of valves comprises:

a first valve coupled with a first side of the accumulator, wherein the first valve is usable to control a flow of the fluid into the accumulator;

a second valve coupled with a second side of the accumulator, wherein the second valve is usable to control flow of an inert material into the accumulator to adjust the pressurization level in the accumulator; and a third valve coupled with a third side of the accumulator that is different from the first side and the second side, wherein the third valve is usable to control flow of the pressure pulse from the accumulator into the flowline.

4. The pressure pulse injector of claim 3, further comprising a plurality of fluid flow lines, wherein the plurality of fluid flow lines comprises:

a first fluid flow line coupled with the first valve to controllably provide the fluid to the accumulator via the first side of the accumulator;

a second fluid flow line coupled with the second valve to controllably provide the inert material via the second side of the accumulator; and a third fluid flow line coupled with a third side of the accumulator, wherein the third fluid flow line extends from the accumulator to the flowline for providing the pressure pulse into the flowline.

5. The pressure pulse injector of claim 1, wherein the plurality of valves comprises a vent valve that is usable to provide pressure relief, based at least in part on the pressurization level, for the accumulator.

6. The pressure pulse injector of claim 1, wherein:

the set of parameters further comprises one or more geometric conditions of the flowline and one or more flowline operating conditions; and the operation of transmitting the pressure pulse into the flowline comprises generating the pressure pulse by selective opening, based at least in part on the change in the pressure that is determinable based on the set of parameters, a subset of the plurality of valves to cause the fluid in the accumulator to reach the pressurization level.

7. The pressure pulse injector of claim 1, wherein the operations further comprise performing a maintenance or repair operation on the flowline based at least in part on the information about the anomaly.

8. A method comprising:

receiving, by a pressure pulse injector, a set of parameters associated with a flowline coupled with the pressure pulse injector, the set of parameters comprising a maximum allowable operating pressure and a distance to a point of interest in the flowline;

determining, based on the set of parameters and by using the pressure pulse injector, a change in pressure for a pressure pulse to reach the point of interest;

in accordance with determining that the change in pressure is approximately less than or equal to the maximum allowable operating pressure, determining, by the pressure pulse injector, a pressurization level for pressurizing fluid in an accumulator of the pressure pulse injector to generate the pressure pulse;

transmitting, by the pressure pulse injector and by controlling a plurality of valves of the pressure pulse injector, pressure the pressure pulse into the flowline; and determining, by the pressure pulse injector and by using a reflected pressure pulse received from the flowline, information about an anomaly in the flowline.

9. The method of claim 8, wherein the accumulator comprises a pressure vessel, wherein the pressure pulse injector further comprises a pressure sensor coupled with the pressure vessel to continuously monitor pressurization of the fluid in the pressure vessel, and wherein transmitting the pressure pulse into the flowline comprises using a reading of the pressure sensor to cause the pressure pulse to be transmitted into the flowline when a measured pressure of the fluid corresponds with the pressurization level.

10. The method of claim 8, further comprising generating the pressure pulse by pressurizing the accumulator by:

controlling a first valve of the plurality of valves to provide the fluid to the accumulator;

controlling a second valve of the plurality of valves to provide inert material to the accumulator to pressurize the accumulator according to the pressurization level; and controlling a third valve of the plurality of valves to provide the pressure pulse to the flowline.

11. The method of claim 10, wherein the pressure pulse injector further comprises a plurality of fluid flow lines, wherein the plurality of fluid flow lines comprises:

a first fluid flow line coupled with the first valve to controllably provide the fluid to the accumulator via a first side of the accumulator;

a second fluid flow line coupled with the second valve to controllably provide the inert material via a second side of the accumulator; and a third fluid flow line coupled with a third side of the accumulator, wherein the third fluid flow line extends from the accumulator to the flowline for providing the pressure pulse into the flowline.

12. The method of claim 8, further comprising, in accordance with determining that a pressure of the accumulator exceeds the pressurization level, venting the accumulator using a vent valve to provide pressure relief for the accumulator.

13. The method of claim 8, wherein:

the set of parameters further comprises one or more geometric conditions of the flowline and one or more flowline operating conditions; and transmitting the pressure pulse into the flowline comprises generating the pressure pulse by selective opening, based at least in part on the change in the pressure that is determinable based on the set of parameters, a subset of the plurality of valves to cause the fluid in the accumulator to reach the pressurization level.

14. The method of claim 8, further comprising performing a maintenance or repair operation on the flowline based at least in part on the information about the anomaly.

15. A system comprising:

a flowline; and a pressure pulse injector comprising:

an accumulator coupled with a flowline, the accumulator sized to receive a fluid;

a plurality of valves coupled with the accumulator to control pressurization of the fluid in the accumulator; and a control system coupled with the plurality of valves and the accumulator to automatically perform operations comprising:

receiving a set of parameters associated with the flowline, the set of parameters comprising a maximum allowable operating pressure and a distance to a point of interest in the flowline;

determining, based on the set of parameters, a change in pressure for a pressure pulse to reach the point of interest;

in accordance with determining that the change in pressure is approximately less than or equal to the maximum allowable operating pressure, determining a pressurization level for pressurizing the fluid to generate the pressure pulse;

transmitting the pressure pulse into the flowline; and determining, using a reflected pressure pulse receivable from the flowline, information about an anomaly in the flowline.

16. The system of claim 15, wherein the accumulator comprises a pressure vessel, wherein the pressure pulse injector further comprises a pressure sensor coupled with the pressure vessel to continuously monitor the pressurization of the fluid in the pressure vessel, and wherein the operation of transmitting the pressure pulse into the flowline comprises using a reading of the pressure sensor to cause the pressure pulse to be transmitted into the flowline when a measured pressure of the fluid corresponds with the pressurization level.

17. The system of claim 15, wherein:

the plurality of valves comprises:

a first valve coupled with a first side of the accumulator, wherein the first valve is usable to control a flow of the fluid into the accumulator;

a second valve coupled with a second side of the accumulator that is opposite the first side, wherein the second valve is usable to control flow of an inert material into the accumulator to adjust the pressurization level in the accumulator; and a third valve coupled with a third side of the accumulator that is different from the first side and the second side, wherein the third valve is usable to control flow of the pressure pulse from the accumulator into the flowline; and the pressure pulse injector further comprises a plurality of fluid flow lines, wherein the plurality of fluid flow lines comprises:

a first fluid flow line coupled with the first valve to controllably provide the fluid to the accumulator via the first side of the accumulator;

a second fluid flow line coupled with the second valve to controllably provide the inert material via the second side of the accumulator; and a third fluid flow line coupled with a third side of the accumulator, wherein the third fluid flow line extends from the accumulator to the flowline for providing the pressure pulse into the flowline.

18. The system of claim 15, wherein the plurality of valves comprises a vent valve that is usable to provide pressure relief, based at least in part on the pressurization level, for the accumulator.

19. The system of claim 15, wherein:

the set of parameters further comprises one or more geometric conditions of the flowline and one or more flowline operating conditions; and the operation of transmitting the pressure pulse into the flowline comprises generating the pressure pulse by selective opening, based at least in part on the change in the pressure that is determinable based on the set of parameters, a subset of the plurality of valves to cause the fluid in the accumulator to reach the pressurization level.

20. The system of claim 15, wherein the operations further comprise performing a maintenance or repair operation on the flowline based at least in part on the information about the anomaly.

* * * * *